F. BAUM.
OPHTHALMOSCOPE.
APPLICATION FILED FEB. 15, 1909.
943,728.
Patented Dec. 21, 1909.
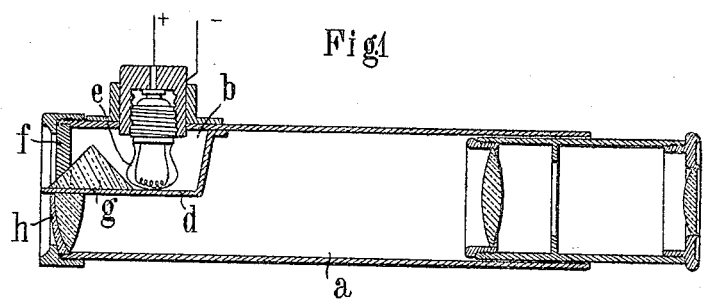
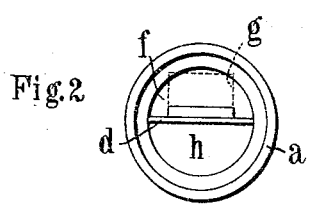
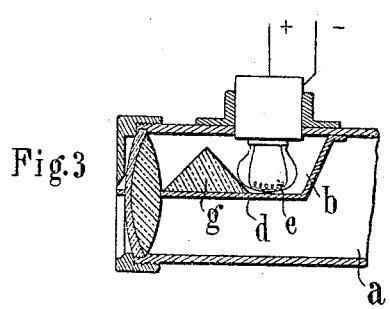
Witnesses
F. Stern
C. Heymann
Inventor
Fritz Baum
by B. Singer
Attorney

UNITED STATES PATENT OFFICE.

FRITZ BAUM, OF PARIS, FRANCE.

OPHTHALMOSCOPE.

943,728.

Specification of Letters Patent. Patented Dec. 21, 1909.

Application filed February 15, 1909. Serial No. 478,135.

*To all whom it may concern:*

Be it known that I, FRITZ BAUM, doctor of medicine, citizen of the United States of America, residing at Paris, France, have invented certain new and useful Improvements in Ophthalmoscopes, of which the following is a specification.

Ophthalmoscopes which shall allow of obtaining an image of the fundus of the eye without disturbance from reflected light, have already been constructed in which the source of illumination is screened in such a manner that only one half of the pupil is illuminated. Such apparatus are, however, very complicated in construction and expensive, while considerable practice is required for their manipulation, so that they have not been generally adopted by the general medical practitioner, and their use has been confined more or less to clinical institutions and for purposes of demonstration.

Now the object of the present invention is to provide an improved ophthalmoscope for the purpose stated which shall be sufficiently simple in use and low in price to insure its adoption by the general medical practitioner, while it enables the fundus of the eye to be examined with accuracy notwithstanding the considerable magnification and brightness of the image.

The invention consists substantially in dividing the tube of the instrument by a longitudinal partition into two chambers, namely, an illuminating chamber and an observation chamber. The illuminating chamber is closed at the rear and in it the source of illumination is located close to the partition and immediately behind a prism also located in the front portion of the said chamber. The front end of this chamber is formed or covered by a screen which stops just short of the partition so as to leave a slit through which one edge of the prism projects. The light rays totally reflected on one side of the prism leave the instrument in the form of a thin ribbon, substantially parallel to said partition. The partition extends beyond the screen and divides the issuing light rays sharply from the deep shadow of the observation chamber in which the field of vision is not disturbed in any way, because all reflected rays are cut off or deflected from this portion of the tube.

Two forms of the improved ophthalmoscope are shown by way of example in the accompanying drawings in which:

Figure 1 is a longitudinal section and Fig. 2 a front elevation of one form, and Fig. 3 is a longitudinal section of the other form.

Referring first to Figs. 1 and 2, $a$ is the tube, the front portion of which is divided by a partition $d$ so as to form a chamber $b$ into which the source of illumination, in this example an electric glow lamp $e$, is introduced from the top or side. The lamp $e$ is placed close to the partition $d$.

A right triangular prism $g$ is arranged quite close to the lamp $e$ in the chamber $b$, with its length transversely to the length of the tube and with its base resting on the partition $d$. The chamber $b$ is closed in front by a screen $f$ and a slit is provided between this screen and the partition $d$. The front edge of the prism $g$ projects through the said slit and completely fills up the same.

The objective $h$ has the form of a half lens arranged in the front end of the observation chamber.

A condensing lens system may be used in conjunction with the prism.

The form shown in Fig. 3 differs from that shown in Figs. 1 and 2, only in that the objective is a whole lens occupying the entire front opening of the tube between the prism and the screen. The prism $g$ and lamp $e$ are shifted farther back accordingly, and the partition $d$ is continued forward past the objective to the screen to form the slit.

The rays being totally reflected by the surface of the prism and emitted with rasent or approximately rasent incidence along the partition prolonged beyond the screen, the shaded part is sharply separated from the illuminated part.

Having now particularly described and ascertained the nature of my said invention and in what manner the same is to be performed, I declare that what I claim is:

1. In an instrument of the class described the combination with a tube, of a partition wall in said tube, adapted to divide the same in two separate chambers, an illuminating body, an opaque screen at one end of one of said chambers, said screen being provided with a slot, and means for discharging the light rays of said illuminating body through said slot in a direction parallel to said partition wall.

2. In an instrument of the class described the combination with a tube, of a partition wall in said tube, adapted to divide the same in two separate chambers, a portion of said partition wall being parallel to the longitudinal axis of said tube, a source of light within one of said chambers, a prism within the same chamber, a screen at the end of said chamber, said screen being provided with a slot and said prism being adapted to deflect the rays issuing from said source of light through said slot in a direction parallel to said portion of the partition wall.

3. In an instrument of the class described the combination with a tube, of a partition wall in said tube, adapted to divide the same in two separate chambers, a portion of said partition wall being parallel to the longitudinal axis of said tube, an illuminating body within one of said chambers, a prism resting with one side on said portion, a screen at one end of said chamber, said screen being provided with a slot parallel to said portion of said partition wall, said prism being adapted to deflect the light issuing from said illuminating body through said slot in a direction parallel to said portion and a condensing lens system for converging certain of the rays of light and directing them through the slot.

In testimony whereof I have hereunto set my hand in presence of two subscribing witnesses.

FRITZ BAUM.

Witnesses:
JOHN BAKER,
ELLWOOD AUSTIN WELDEN.